A. WHITEWAY & C. HUBBARD.
FLUID PRESSURE HEAT ENGINE.
APPLICATION FILED JAN. 6, 1908.
923,226.
Patented June 1, 1909.
3 SHEETS—SHEET 1.
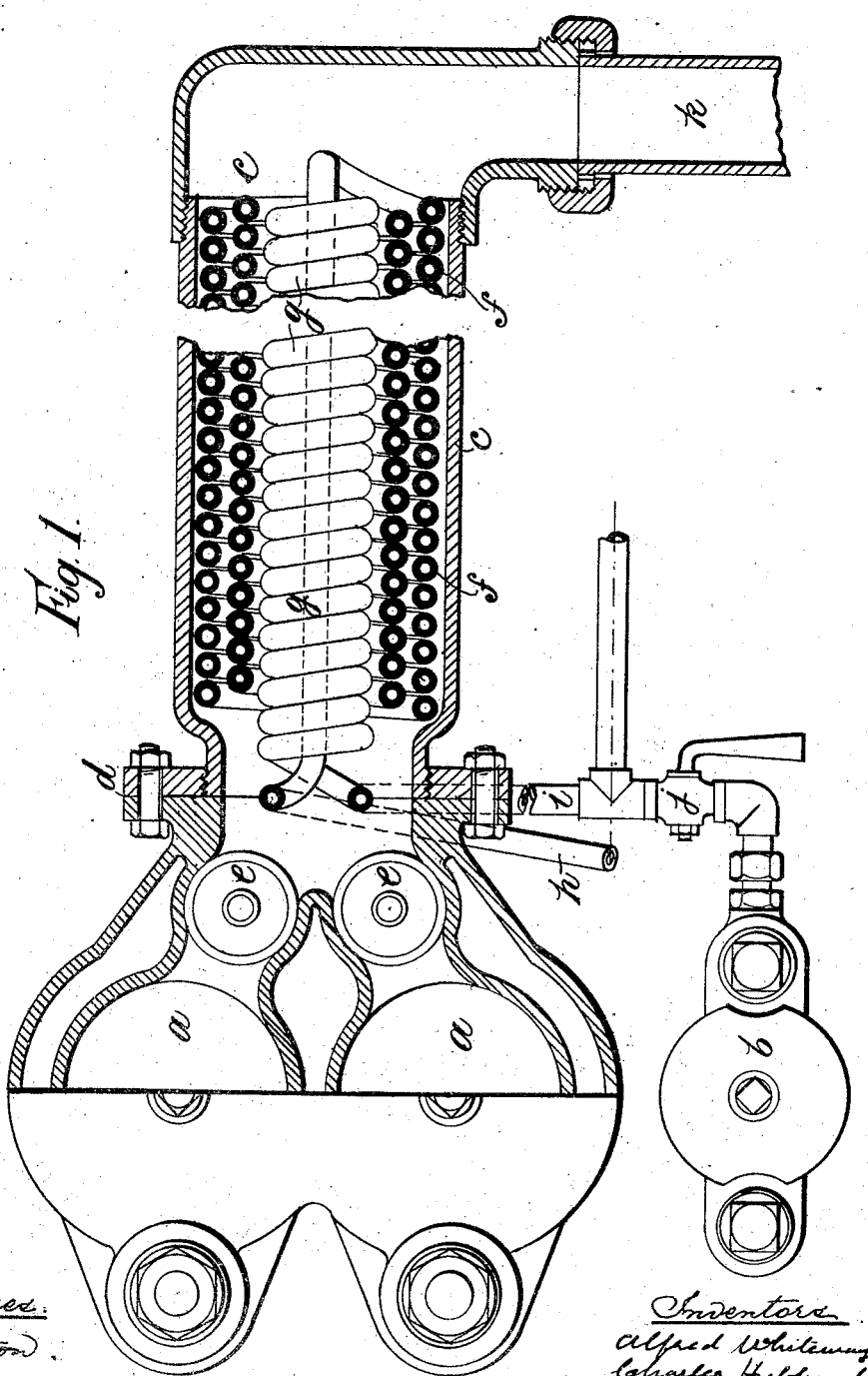

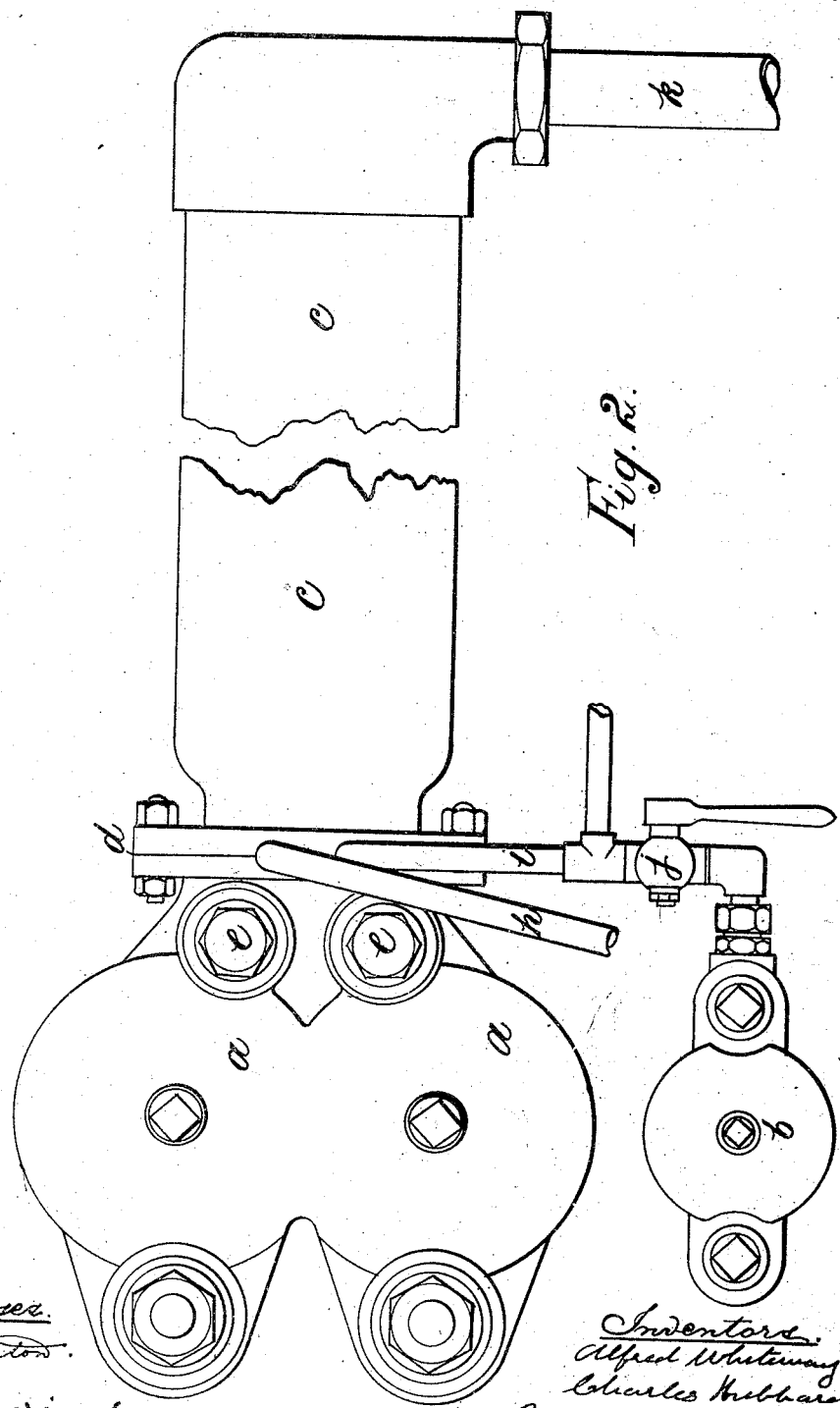

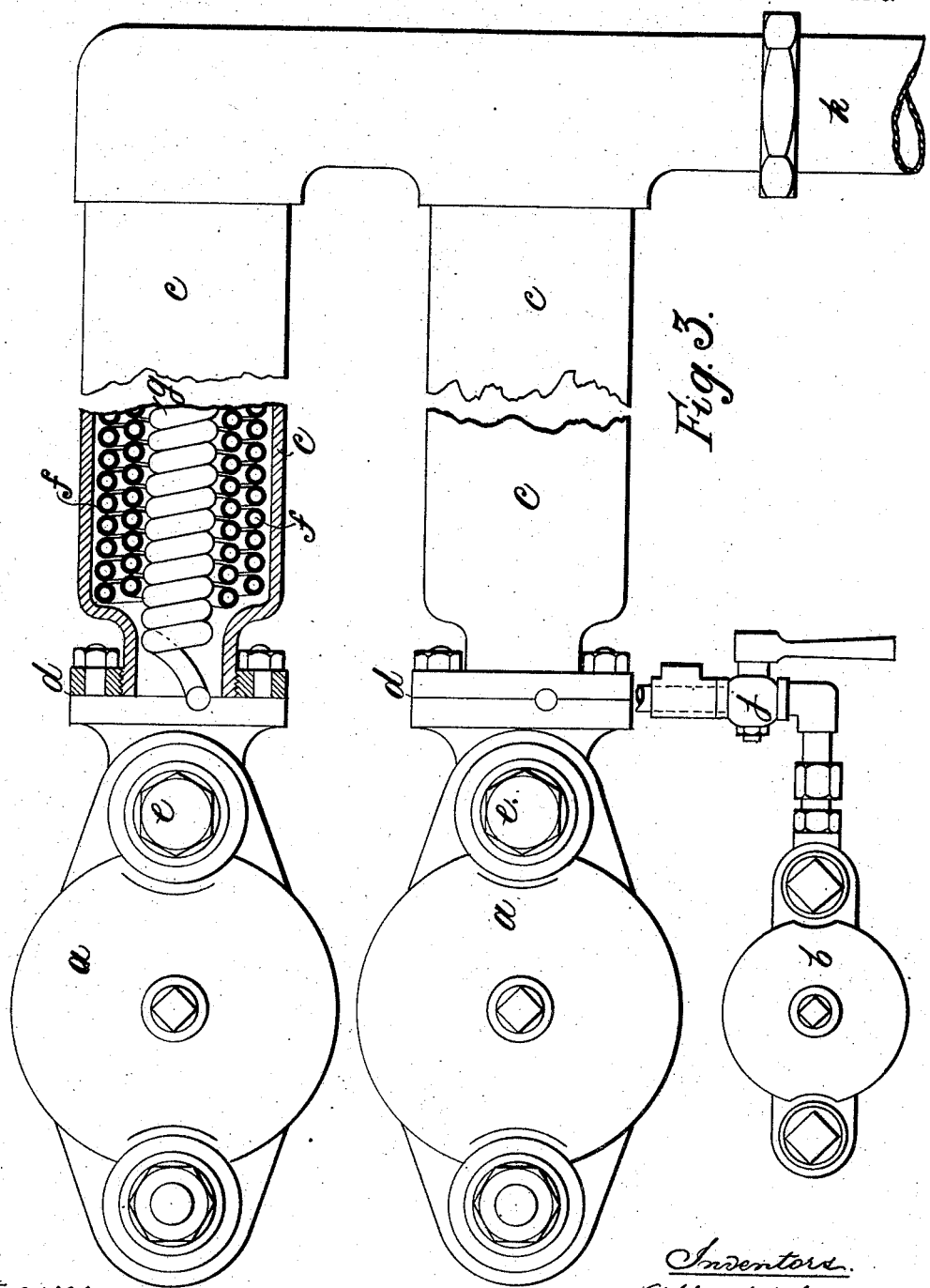

UNITED STATES PATENT OFFICE.

ALFRED WHITEWAY, OF SALE, AND CHARLES HUBBARD, OF HEATON MOOR, ENGLAND.

FLUID-PRESSURE HEAT-ENGINE.

No. 923,226.

Specification of Letters Patent.

Patented June 1, 1909.

Application filed January 6, 1908. Serial No. 409,479.

*To all whom it may concern:*

Be it known that we, ALFRED WHITEWAY, a subject of the King of Great Britain and Ireland, residing at Moss Bank, Albert Road, Sale, in the county of Chester, England, sub-manager, (post-office address,) and CHARLES HUBBARD, a subject of the King of Great Britain and Ireland, residing at 34 Hawthorn Grove, Heaton Moor, in the county of Lancaster, England, engineer, (post-office address,) have invented Improvements in Fluid-Pressure Heat-Engines, of which the following is a specification.

This invention relates to improvements in fluid pressure heat engines, the object of the invention being to effect the combination of an internal combustion engine with a steam engine or engines in such a manner that the heat generated during the operation of the first class of engine can be utilized for the instantaneous generation of steam to be afterward used in a steam engine or engines, thereby effecting great economy by utilizing the heat energy of the exhaust gases of the internal combustion engine before discharging such gases into the atmosphere.

Our invention will be fully described with reference to the accompanying drawings which indicate the application of our invention to engines suitable for driving motor cars though we would have it understood that modifications of the arrangement may be made without departing from the essential features of our invention to enable it to be adapted to engines for other driving purposes.

In the accompanying drawings Figure 1 is a plan, partly in section, of an internal combustion engine having two cylinders and coupled to means whereby steam may be generated for use in a single cylinder steam engine. Fig. 2 external plan of same and Fig. 3 plan, partly in section, indicating separate internal combustion cylinders delivering exhaust gases into separate generators.

In carrying out our invention we utilize an internal combustion engine of any of the types at present in use which derive their power from an explosive mixture as will be well understood, such engine having a plurality of cylinders $a$ as in the drawings, or only one cylinder, and the usual mechanism which comprises the whole of the engine, that is to say the usual or necessary means for controlling the admission and utilization of the explosive mixture together with the usual connections for driving purposes. In conjunction with such an engine we employ a second engine $b$ capable of being operated by steam, such engine also having one or a plurality of cylinders and otherwise provided with all the mechanism necessary to the complete operation of the engine. Both engines are arranged in suitable proximity to each other and in order to utilize the heat energy existing in the exhaust gases from the cylinders $a$ of the internal combustion engine we may lead such gases into a silencer as at present or, as we prefer, dispense with the silencer and lead them directly to a flash boiler $c$ virtually arranged in the exhaust tube of the internal combustion engine, suitable joint connections $d$ being adopted between the engine and boiler.

$e$ are the exhaust valves between the cylinders and boiler which may be operated in any suitable way to allow the exhaust gases to be discharged into the boiler. The latter may be of any suitable construction of the instantaneous steam-generating type but we prefer to make it with one or a plurality of coils of pipe $f$ arranged as close as possible to the shell of the boiler and terminating in a central coil $g$. The coil or coils of pipe are supplied with water internally from a suitable source, such as a pump, and the ends of the pipe terminate near to the internal combustion and steam cylinders.

$h$ shows the water inlet of the pipe while $i$ is the outlet pipe for steam, the latter being coupled to the steam engine in any suitable way and controlled by a valve $j$. The arrangement enables steam to be instantaneously generated in the boiler by the application of heat from the exhaust gases of the internal combustion engine and after the steam has been utilized for working the steam engine it is afterward exhausted from the latter in the usual way. In order to facilitate the construction and repair of this device, the pipes $h$ and $i$ are clamped in cross-grooves formed in the two flanges of the joint connection $d$, and the said flanges are secured together by suitable bolts or other fastening devices which form a tight joint and hold the said pipes in place. The exhaust gases from the internal combustion engine after being utilized to generate steam are discharged through the exhaust $k$ to the atmosphere or into a silencer, if required.

The two internal-combustion cylinders $a$ $a$ are provided with a single exhaust passage common to both, and this exhaust passage is connected to one end of the cylindrical shell of the boiler $c$. The exhaust pipe is connected to the other end of the said boiler shell, and the water-tubes $f$ and $g$ are coiled spirally and arranged in concentric layers within the said boiler shell. In this manner the heat is supplied from the cylinders $a$ $a$ alternately, and the heating action on the coils is practically continuous.

In Fig. 3 a separate flash boiler is used in connection with each cylinder of the internal combustion engine, the exhaust gases from both, after performing their function of heating the coils passing out through a single exhaust passage as indicated or through separate passages.

By means of an arrangement such as described or any modification of such the whole of the heat energy of the exhaust gases from the internal combustion engine, or a great proportion of such, is utilized in doing useful and effective work by generating steam for use in the steam engine and we are thus able to combine the advantages of the two types of engine and effect great economy. The combination may be utilized for any of the power purposes for which separate engines are now used and we may, by the aid of suitable mechanical arrangements, run the internal combustion engine as ordinarily and allow the exhaust gases to escape directly as is at present the case where the power required or obtained from such is necessary for the work in hand. On the other hand we work the steam engine in conjunction with the internal combustion engine so as to entail a simultaneous driving effect on the main shaft of the engine or we may arrange the steam engine to be capable of being engaged or disengaged with the main engine or other shaft or part to be driven by the aid of a clutch or similar mechanism. The steam engine can therefore be utilized as an auxiliary to the main internal combustion engine.

What we claim as our invention and desire to secure by Letters Patent is:—

The combination, with an internal combustion cylinder having an exhaust passage, of a boiler-shell, one end portion of the said shell and the said passage being provided with flanges having cross-grooves in their meeting surfaces and the other end portion of the said shell being provided with an outlet for cool gas, a water-pipe provided with a series of coils arranged in said shell and having its end portions arranged in the said cross-grooves, and fastening-devices for securing the said flanges together and clamping the end portions of the said pipe in the said cross-grooves.

In testimony whereof we have hereunto set our hands in the presence of two witnesses.

ALFRED WHITEWAY.
CHARLES HUBBARD.

Witnesses:
AMY E. EVINS,
JOSEPH BENTON.